United States Patent [19]

Kim et al.

[11] Patent Number: 5,673,289
[45] Date of Patent: Sep. 30, 1997

[54] METHOD FOR ENCODING DIGITAL AUDIO SIGNALS AND APPARATUS THEREOF

[75] Inventors: Sang-wook Kim, Seoul; Yeon-bae Kim, Suwon; Yang-seock Seo, Seoul, all of Rep. of Korea

[73] Assignee: Samsung Electronics Co., Ltd., Kyungki-do, Rep. of Korea

[21] Appl. No.: 360,354

[22] Filed: Dec. 21, 1994

[30] Foreign Application Priority Data

Jun. 30, 1994 [KR] Rep. of Korea ............... 94-15694

[51] Int. Cl.$^6$ ............................................. H04B 14/04
[52] U.S. Cl. ................. 375/243; 375/241; 341/200; 348/398; 348/405; 348/418; 348/422; 395/2.21; 395/2.38; 395/2.39
[58] Field of Search .................. 375/242, 243, 375/240, 241; 341/200; 348/398, 405, 418, 419, 421, 422; 364/725, 726; 395/2.21, 2.29, 2.38, 2.39; 382/253

[56] References Cited

U.S. PATENT DOCUMENTS 5,471,558 11/1995 Tsutsui ........................... 395/3.28
5,490,170 2/1996 Akagiri et al. ........................... 375/240
5,508,949 4/1996 Konstantinides ........................ 364/725

*Primary Examiner*—Stephen Chin
*Assistant Examiner*—Don Vo
*Attorney, Agent, or Firm*—Rothwell, Figg, Ernst & Kurz, P.C.

[57] ABSTRACT

A method and an apparatus for encoding a digital audio signal are provided. The method comprises the steps of: mapping the digital audio signal into a plurality of sub-bands and outputting the mapped sub-band signals; allocating a number of bits to each sub-band signal according to human psychoacoustic properties, on the basis of the mapped sub-band signals; compensating each sub-band signal by receiving a transmitted previous quantized error, quantizing the compensated sub-band signals according to the corresponding allocated bit number, and transferring the current quantized error to the next quantization; and forming a transmit bit stream in frame units from the quantized data. Therefore, the quantized error generated during encoding of the audio signal is can be minimized.

12 Claims, 3 Drawing Sheets

METHOD FOR ENCODING DIGITAL AUDIO SIGNALS AND APPARATUS THEREOF

BACKGROUND OF THE INVENTION

The present invention relates to a method and an apparatus for encoding digital audio signals, and more particularly, to a method and an apparatus for encoding digital audio signals for improving a tone quality by allocating a number of bits according to human psychoacoustic properties and reducing a quantization error.

Generally speaking, audio equipment provides users with listening pleasure by recording a sound signal on a recording medium and reproducing the recorded signal from the medium as desired. Along with the recent development of digital signal processing technology, existing audio instrumentation is undergoing rapid replacement. That is, a long player and a magnetic tape player for recording/reproducing analog audio signals are being supplanted with a compact disk player and a digital audio tape player for recording/ reproducing digital audio signals. Here, the digital processing of an audio signal improves the tone quality, but results in the adverse effect of greatly increasing data quantity.

The above data-quantity problem can be alleviated by considering the psychoacoustic properties of humans. This is accomplished by an MPEG (Moving Pictures Expert Group) audio system whose standardization has been recently set by the International Organization for Standardization or the commercialized digital compact cassettes (DCC) and MiniDisc (MD). A technology using these human psychoacoustic properties is described as follows.

Generally, after the signals are divided by bands, the signals are processed in a processing of the phonetics or audio data. There are two reasons for processing the signals after division into bands. The first reason, as one aspect of signal processing, is to prevent a quantized error generated by a quantization from broadly affecting the bands during restoration. The second reason, in which human susceptibility is considered, is for suitably weighing the effects of the human auditory system during signal processing.

Research into the human auditory system has extended into the field of psychoacoustics. According to studies in this field, a human experiences a disturbance in accordance with the intensity of signals within a critical band (the processing band) and the amount of quantized noise therein. Here, the conventional method allocates bits using the maximum amount of quantized noise which can exist in each processing band but cannot be perceived even though the human ear can hear the noise.

In this method, the quantized noise to be generated is below the maximum quantity which can exist in a certain processing band. However, there is a problem in that the sum of the quantized noise components is an imperceptible quantization error, but a specific frequency component can surpass the limit of the quantized noise.

SUMMARY OF THE INVENTION

To solve the above problems of the conventional art, it is an object of the present invention to provide a method and an apparatus for encoding a digital audio signal, which transfers a quantized error generated for each frequency component to an adjacent signal, to reduce the sum of noise components generated in each processing band and a quantized error generated for each frequency component value.

To accomplish the above object, the encoding method according to the present invention comprises the steps of: mapping a digital audio signal into a plurality of sub-bands and outputting the mapped sub-band signals; allocating a number of bits to each sub-band signal according to human psychoacoustic properties, on the basis of the mapped sub-band signals; compensating each sub-band signal by receiving a transferred previous quantized error, quantizing the compensated sub-band signals according to the corresponding allocated bit number, and transferring the current quantized error to the next quantization; and forming a transmit bit stream in frame units from the quantized data.

Each sub-band is characterized by a critical band having undistinguishable tone signals.

The bit number allocating step is comprised of the steps of: calculating a signal-to-masked threshold ratio for each sub-band as a band ratio; calculating the sum of the band ratio of each sub-band to obtain each channel ratio of a plurality of channel; calculating an important factor of each channel according to the ratio of the respective channel ratio to sum of the channel ratios; allocating the channel bit number from total bit numbers according to the obtained important factor of each channel; calculating an important factor of each sub-band according to the ratios of the respective band ratio each channel ratio; and allocating the band bit number from total channel bit number according to the obtained important factor of each band.

The above masked threshold is obtained through the following steps of: discrete-Fourier-transforming an analog audio signal and calculating the quantity of each signal in every sub-band of the transformed signal; dividing the spectrum values in the sub-band of the signal into a plurality of critical bands and calculating the sum of power in each critical band; calculating the masked threshold by the signal frequency and sum of power; setting up the maximum masked threshold in each critical band as a temporary masked threshold in the corresponding critical band; and comparing a no-signal threshold with the temporary threshold and setting up the higher of the two as a final masked threshold of the corresponding critical band.

The channel ratio of each channel is offset-corrected by subtracting a product value of the minimum band ratio among the band ratios multiplied by the number of bands. The bit number of each band is allocated from a higher frequency component to a lower frequency component among the sub-band signals, considering the important factor of each band. The ratio of each band is offset-corrected by subtracting the minimum band ratio of the ratios from the ratio of each band. The important factor of the band is newly obtained from the ratio of the band to which a number of bits is not allocated. When the bit number of a band is allocated, a band weight can be considered.

In the quantizing step, the signals of each band are divided into tonal signals and non-tonal signals. The quantized error generated from a tonal signal is corrected by a tonal signal, and the quantized error generated from a non-tonal signal is corrected by a non-tonal signal.

Also, another method for encoding a digital audio signal according to the present invention comprises the steps of: mapping a digital audio signal into a plurality of sub-bands and outputting the mapped sub-band signals; allocating a number of bits to the sub-band signal of each sub-band according to human psychoacoustic properties, on the basis of the mapped sub-band signals; compensating each sub-band signal by receiving a transmitted previous quantized error considering band weight, quantizing the compensated sub-band signal according to the allocated bit number, and transferring the current quantized error to the next quantization considering band weight; and forming a transmit bit stream in frame units from the quantized data.

The apparatus for encoding a digital audio signal according to the present invention comprises: a mapping unit for mapping a digital audio signal into a plurality of sub-bands and outputting the mapped sub-band signals; a bit number allocating unit for allocating a number of bits to the sub-band signal of each band according to human psychoacoustic properties, on the basis of the mapped sub-band signals; a quantizing unit for compensating each sub-band signal by receiving a transmitted previous quantized error, quantizing the compensated sub-band signal according to the allocated bit number, and transferring the current quantized error to the next quantization; and frame packing means for forming a transmit bit stream in frame units from the quantized data.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
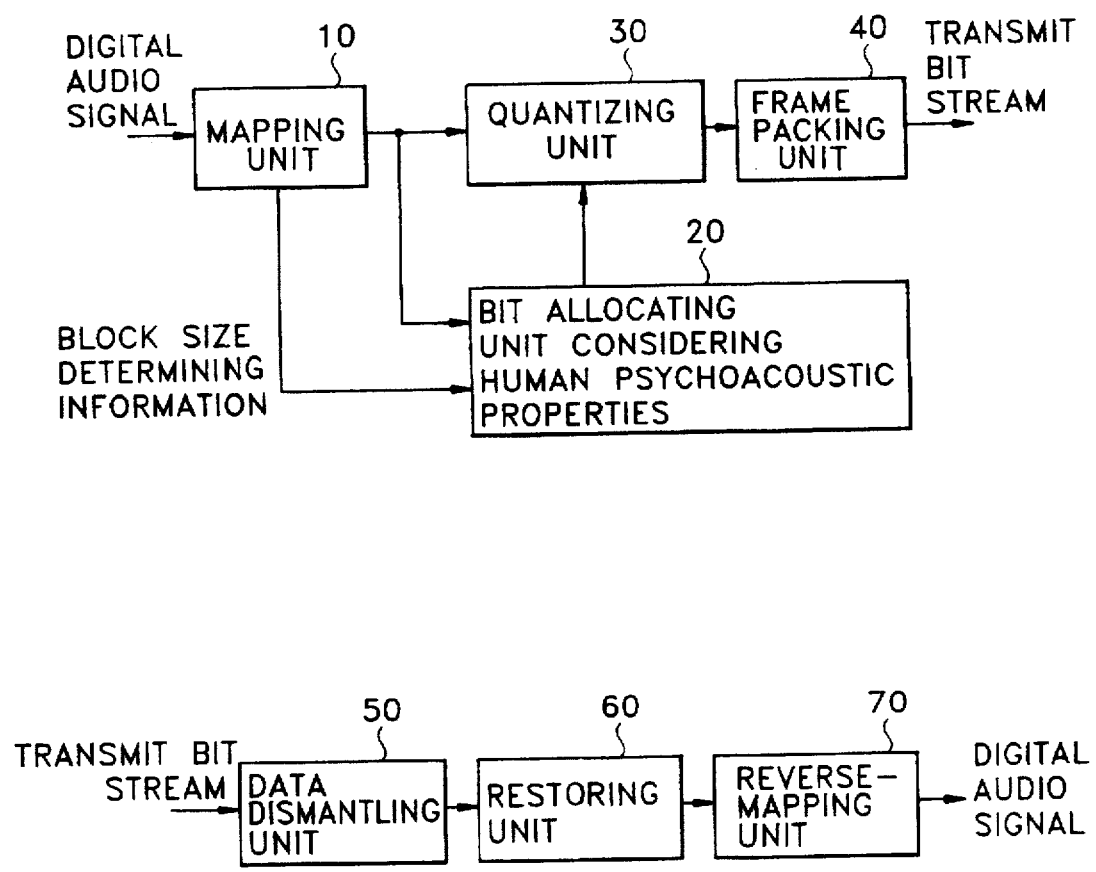
FIG. 1 is a block diagram of an apparatus for encoding and decoding a digital audio signal by considering human psychoacoustic properties according to the present invention.

Referring to the appended drawings, the present invention will be described in detail.

When an audio instrument manufactured in consideration of human psychoacoustic properties performs an encoding operation, the main goal of the encoding is not removing generated noise but processing the noise not so as to be perceived. After a masked threshold, that is, the level at which a human first perceives one input signal masks another and which varies according to a masking phenomenon and critical bands, is obtained, the bits are allocated according to the important factor using the ratio between the masked threshold and the quantized noise.

Looking into the masking phenomenon and the critical band among human psychoacoustic properties, for example, the masking phenomenon of a conversation taking place near a railway where communication is possible even in a low voice, but when a train passes by, conversing becomes impossible at the same vocal levels. That is, due to an interaction between the sound of conversation and the sound generated by the train, a desired sound (the conversation) is masked, whereby it is difficult to hear the sound or the sound cannot be heard at all.

The critical band is a region in which the tone cannot be distinguished at the frequency where a signal and noise have very similar responses.

In general, the transmission of music or voice information is performed according to time and the masking effect is also performed according to time. In a pre-masking phenomenon (or backward masking), first, a signal appears and then the signal is masked by a masker following the signal. The simultaneous masking phenomenon is generated when the signal and masker occur simultaneously. In the post-masking phenomenon (or forward masking), a signal generated after the masker appears is masked. This phenomenon, for example, can be experienced by listening to a sustained loud signal (e.g., music in a discotheque) for a time, after which normal-level signals cannot be heard until the effects of the loud music wear off.

In each band, the masking effect caused by a signal power at a specific frequency is calculated by a following masking equation.

$$E(x) = B(x) * S(x) \tag{1}$$

where $S(x)$ is the signal power of a critical band, $B(x)$ is a spreading function modeling the masking phenomenon of a human auditory organ (ear), and $E(x)$ is a varied masked threshold. The operator "*" is a linear convolution. Here, the spreading function $B(x)$ is expressed as follows.

$$10 \log B(x) = 15.81 + 7.5(x+0.474) - 17.5\{1+(x+0.474)^2\}^{1/2} \tag{2}$$

The masked threshold obtained through such a process represents a signal strength which cannot be perceived when the human listens to the sound below threshold. The masked threshold has a stepped waveform since the signal strength is constant at every band.

The present invention relates to a method for minimizing a quantizing noise generated in a processing band when the quantizing process is performed after the bit number to be used in each channel is determined according to the important factor (IMF).

FIG. 1 is a block diagram of an apparatus for encoding and decoding a digital audio signal according to the present invention. An encoding block is composed of a mapping unit 10, a bit allocating unit 20, a quantizing unit 30 and a frame packing unit 40. A decoding block is composed of a data dismantling unit 50, a restoring unit 60 and a reverse-mapping unit 70.

In mapping unit 10, the input signal is divided into a processing band by sub-band filtering and is output. The input signals are divided according to band so that, when a signal is restored, the effects of quantized noise generated during the quantizing process are decreased. The band sub-division is also convenient when considering critical band effects on the human psychoacoustic system.

In bit allocating unit 20, the bits are allocated according to the following method by receiving block-size determining information and frequency information. That is, bit allocating unit 20 allocates the number of bits to each band of the input signal divided by bands in mapping unit 10, considering human psychoacoustic properties. The fact that when a signal is input, the human can listen and feel a signal whose strength is above a constant signal, and when various kinds of signal are input, the minimum signal strength required for listening and feeling is varied from an absolute threshold by the interaction between the input signals, is considered. The bits are allocated using the input signal and the varied masked threshold which is the minimum strength of input information required for listening and feeling the information.

The calculation of masked threshold and the bit allocation are performed as follows in the frequency region.

1. The quantity of each signal is obtained according to the frequency components by discrete-Fourier-transforming the input signal.

2. The spectrum values at the frequency region are divided into the critical values having the same undistinguishable tone as shown in Table 1, and the sum of power at each band is obtained.

3. After the sum of power is obtained, the masking effect is generated by the frequency and the signal power is calculated using Equation 1.

4. The maximum value among the values of each band, obtained as the result, is set up as a temporary masked threshold of the band.

5. The temporary masked thresholds of each band are compared with the thresholds of each band in a calm condition (a no-signal condition) and the higher value between the two is set up as a final masked threshold of each band.

6. The signal-to-masked threshold ratio (SMR) which is the ratio of an input signal to the masked threshold, is calculated.

7. After $SMR_{jk}$ is calculated by each band k in each of channels j, $SMR_{jk}$ of all bands in each channel are offset-corrected and added up, whereby $SMRT_j$ of each channel is obtained. Here, a value to be used for the offset-correction is represented as $SMR_j$min, which is the minimum value among $SMR_{jk}$ of each band in each channel.

TABLE 1

| band No. | center frequency (kHz) | bandwidth (kHz) | lower mask frequency (kHz) | upper mask frequency (kHz) |
|---|---|---|---|---|
| 1 | 50 | — | — | 100 |
| 2 | 150 | 100 | 100 | 200 |
| 3 | 250 | 100 | 200 | 300 |
| 4 | 350 | 100 | 300 | 400 |
| 5 | 450 | 110 | 400 | 510 |
| 6 | 570 | 120 | 510 | 630 |
| 7 | 700 | 140 | 630 | 770 |
| 8 | 840 | 150 | 770 | 920 |
| 9 | 1000 | 160 | 920 | 1080 |
| 10 | 1170 | 190 | 1080 | 1270 |
| 11 | 1370 | 210 | 1270 | 1480 |
| 12 | 1650 | 240 | 1530 | 1770 |
| 13 | 1850 | 280 | 1710 | 1990 |
| 14 | 2150 | 320 | 2000 | 2320 |
| 15 | 2500 | 380 | 2320 | 2700 |
| 16 | 2900 | 450 | 2700 | 3150 |
| 17 | 3400 | 550 | 3150 | 3700 |
| 18 | 4000 | 700 | 3700 | 4400 |
| 19 | 4800 | 900 | 4400 | 5300 |
| 20 | 5800 | 1100 | 5300 | 6400 |
| 21 | 7000 | 1300 | 6400 | 7700 |
| 22 | 8500 | 1800 | 7700 | 9500 |
| 23 | 1050 | 2500 | 9500 | 1200 |
| 24 | 1350 | 3500 | 1200 | 1550 |

$$SMRT_j = \sum_{k=1}^{m} SMR_{jk} - mSMR_j\text{min} \tag{3}$$

where m means the number of remained processing bands.

8. The important factor, $IMF_j$, of each channel is calculated as follows.

$$IMF_j = \frac{SMRT_j}{\sum_{j=1}^{n} SMRT_j} \tag{4}$$

where n is the number of channels.

9. According to the important factor of each channel, calculated by the above equation (4), the bits are allocated to each channel by the following equation.

$$BT_{ch} = IMF_j \times BTT \tag{5}$$

where $BT_{ch}$ represents the number of bit which is allocated to each channel and BTT represents the sum of the number of bits which can be used by all channels and decided by a compression ratio of data when time is "t."

10. The important factor, $IMF_k$, of each band is calculated from $BT_{ch}$ (the number of bits allocated to each channel by offset-corrected $SMR_{jk}$ of each band), whereby the number of bits used in each band is allocated by following method.

1) First, the important factor of each band is obtained, the required bit number is compared with the requiring bit number from the high frequency component, considering the above-calculated important factor. Thereafter, if the comparison satisfies a condition, the number of bit is allocated to the corresponding band.

2) After the usable bit number and the sum of the remaining $SMR_{jk}$ are corrected, steps 1 and 2 are repeated until all bits are used up.

In more detail, the value of $B_{bd}$ (the bit number of a band, which can be used in each band k, using $BT_{ch}$ according to important factor $IMF_k$ of the band) is assumed as follows.

$$BT_{bd} = BT_{ch} \left( \frac{SMRT_{jk} - SMR_j\text{min}}{SMRT_j} \right) \tag{6}$$

11. It is determined whether calculated band bit number $BT_{bd}$ is larger than requiring bit number $BT_N$. Here, required bit number $BT_N$ is the sum (scale factor and the minimum bit number to be used during quantization) of a bit number additionally used according to the bit allocation to the input data of a band. If the calculated bit number is less than the required bit number, the number of bits allocated to band k of channel j is zero.

The important factor of SMR in the remaining band is changed by allocating the bits to a band. That is, after the bit allocating process is performed in one band, the immediately preceding SMR value is subtracted from the $SMRT_j$ value and the band number used for calculating the important factor is excluded, thereby easily obtaining the important factor calculated by using the remaining band.

The above procedure is to obtain the bit number of a new channel by considering only the bit number used when the bits are allocated by the channel bit number and the important factor, and for allocating the bit number of the channel to each band according the updated important factor. This procedure is repeated as many times as the number of bands, whereby the bit number to be allocated to each band can be calculated.

As a general characteristic of the signal, much signal information is concentrated on a low frequency band and less signal information is concentrated on a high frequency band. Here, the scale factor to the high frequency part having many parts without information is considered in the process when the bit is allocated from the low frequency part. Thus, when the bit is allocated to the high frequency band, the bit for the unused scale factor is also allocated. Accordingly, the given bit cannot be used efficiently in the process.

Therefore, the high frequency part is preferentially processed, whereby the unnecessary part is selected prior to the following process. Thus, the bit is efficiently allocated by considering the unused scale factor which is often generated in the high frequency band.

Also, as shown in following equation, the requiring bit number to be used is multiplied by a weight $W_{jk}$ of each band, thereby controlling the bit allocation for allocating many bits to a specific frequency band.

$$BT_{bd} = BT_{ch} W_{jk} \left( \frac{SMR_{jk} - SMR_j\text{min}}{SMRT_j} \right) \tag{7}$$

The bit can be allocated by considering the human psychoacoustic properties in bit allocating unit 20 as described above. Especially, the weight of a band is considered, thereby allocating many bits to the high frequency part. This has the same effect as emphasizing a signal of the high frequency part in a pre-emphasis unit which is used for processing a phonetic signal.

Quantizing unit 30 performs the quantization according to following method. A method for reducing the sum of the quantizing noise generated in each processing band when the bit is allocated to each processing band in each of channels is as follows. Here, referring to the psychoacoustics, the reason for reducing the sum of the quantizing noise generated in each processing band is that the human feels a disturbance according to the signal power of a critical band (processing band) and the quantity of the quantizing noise generated in the critical band.

In each processing band, when each frequency component is processed, the values of the frequency component are quantized in order, from the high frequency component to the low frequency component and vice versa.

After a quantized error (generated when a value of a frequency component is quantized) is transferred to an adjacent frequency component or the following frequency component, thereby compensating the frequency component, the quantization is performed. Thus, the error which can be generated when the sum of the frequency components in one processing band exists, is minimized.

In the compensation, assuming that the value of the frequency component at time "t" and frequency position "k" is represented by $X_t(k)$, that the quantizing unit is represented by Q and that the frequency component quantized is represented by $QX_t(k)$, error $EQ_t(k)$ caused by the quantization is calculated by the following equation.

$$EQ_t(k)=X_t(k)-QX_t(k) \tag{8}$$

Figure 2:
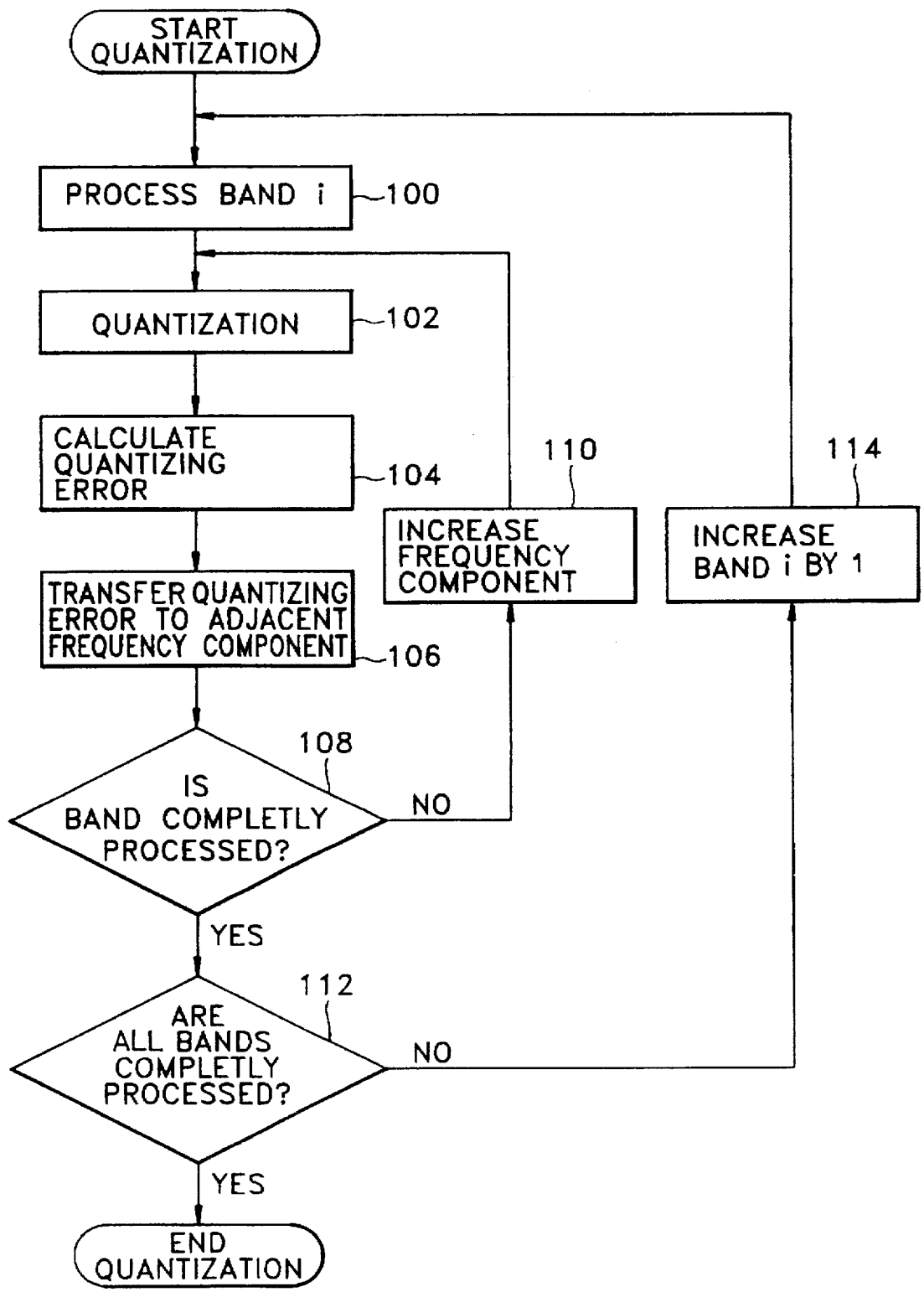
FIG. 2 is a diagram for describing a quantization processing algorithm according to the present invention.

To compensate the next frequency component with the calculated error, $X_t(k+1)$ is varied by $X_t(k+1)+EQ_t(k)$ and the quantization of the updated value $X_t(k+1)$ is performed. The new quantized error of processing band is repeatedly calculated by $QX_t(k+1)$, thereby minimizing the sum of error generated in the processing band. Error $EQ_t(k)$ generated in the above case is transferred to the adjacent signal by considering a weight $W(k+1)$, thereby reducing the sum of error generated in the band. That is, new value whose error is corrected by $X_t(k+1)+EQ_t(k)W(k+1)$ is obtained and used for the quantization. Referring to FIG. 2, according to the quantizing process algorithm of the present invention, first, a processing band i is set (step 100), the quantization of the band is performed (step 102) and the quantized error is calculated by Equation 8 (step 104). The calculated error is transferred to the adjacent frequency component (step 106) and it is determined whether the quantization of processing band i is completed (step 108). If the quantization is not completed, the frequency component is increased for performing step 102. As described above, if the quantization of all frequency components in processing band i is completed, it is determined whether the quantization of all the bands is completed (step 112). If the quantization of all the bands is not completed, the processing band is increased (step 114) and the next step (step 100) is performed. At step 112, if the quantization of all the bands is completed, the quantization is completed. During the quantizing process, the error is transferred to the adjacent frequency component thereby reducing the quantizing noise. The above quantizing process will be described in detail referring to a preferred embodiment.

Figure 3:
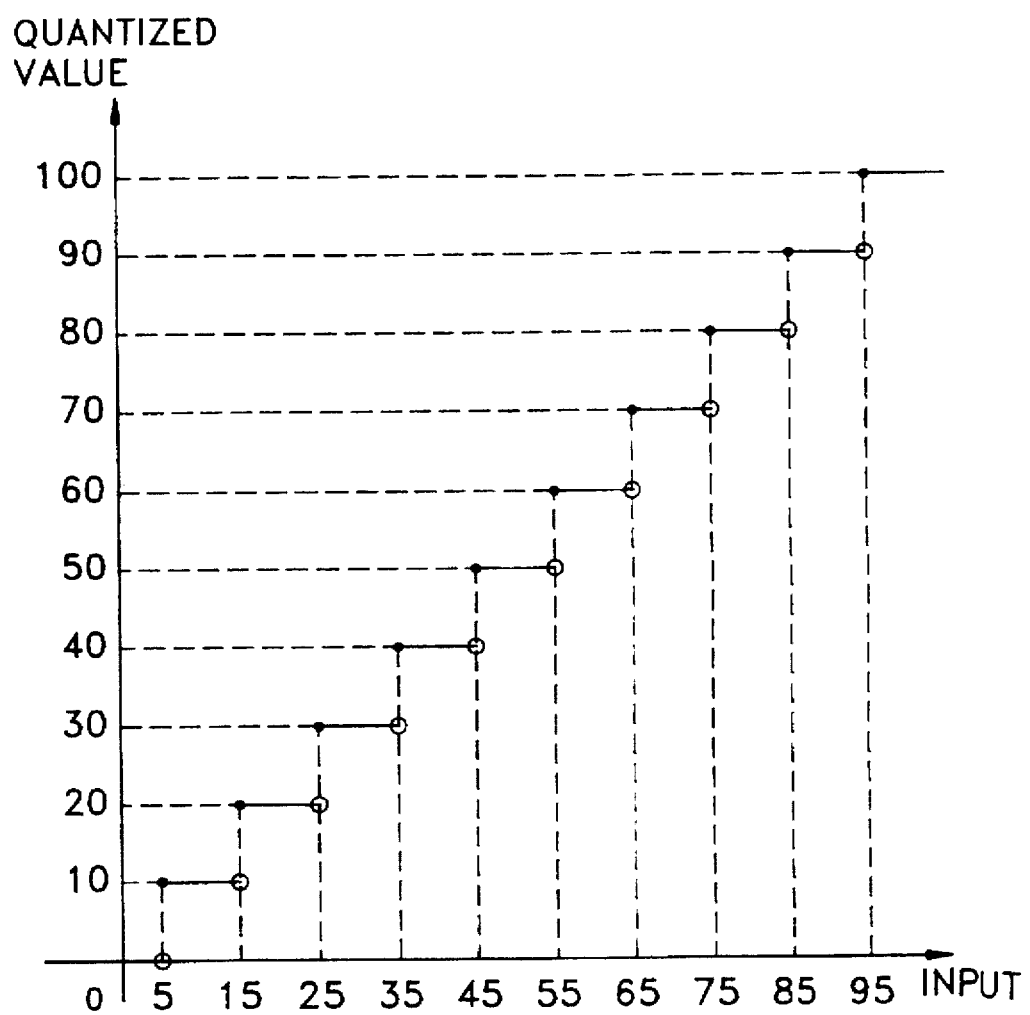
FIG. 3 is a diagram for describing a quantization construction of a quantizing unit of a preferred embodiment according to the present invention.

Suppose that the quantizing process has a quantizing characteristic shown in FIG. 3 and a frequency component value as shown in Table 2.

TABLE 2

| frequency component value | 94 | 54 | 64 | 84 | 94 | 84 |
|---|---|---|---|---|---|---|
| compensation of quantized error | 0 | 54 + 4 | 64 − 2 | 84 + 2 | 94 − 4 | 84 + 0 |
| result of quantization | 90 | 60 | 60 | 90 | 90 | 80 |
| quantizing error | 4 | −2 | 2 | −4 | 0 | 4 |

As shown in Table 2, if the values of the frequency component in a processing band are 94, 54, 64, 84, 94 and 84, the results of the quantization are 90, 50, 60, 80, 90 and 80 according to the conventional quantizing method. Thus, the sum of the error generated in the processing band is 24. On the contrary, according to the method of the present invention, all immediately preceding errors are corrected, whereby the quantizing noise generated in the processing band is reduced to four.

Also, in the quantizing process, the signals in the processing band are divided into a tonal signal and a non-tonal signal, so as to differently process the signals. Thus, the quantized error generated in a tonal signal is corrected by the tonal signal and the quantized error generated in a non-tonal signal is corrected by the non-tonal signal. As a result, the quantized error generated when the power of signals having tonal and non-tonal signals is processed, is minimized to thereby improve tone quality. The quantized data is then coded for compressing the data.

In frame packing unit 40, a transmit bit stream in a frame unit is formed from the data generated after the quantizing process.

As described above, the present invention optimizes the bit number allocation by considering human psychoacoustic characteristics and transfers the quantized error to the adjacent frequency component, thereby reducing the sum of quantizing noise. As a result, the difference between an original sound and a reproduced sound which can be detected by the human ear, can be minimized.

What is claimed is:

1. A method for encoding each digital audio signal of a plurality of channels comprising the steps of:

mapping a digital audio signal into a plurality of sub-bands and outputting the mapped sub-band signals;

allocating a number of bits to each mapped sub-band signal according to human psychoacoustic properties, on the basis of said mapped sub-band signals;

compensating said each mapped sub-band signal by receiving a transmitted previous quantized error, quantizing the compensated sub-band signals according to the corresponding allocated bit number, and transferring the current quantized error to a next quantization of an adjacent frequency component of the same sub-band; and forming a transmit bit stream in frame units from said quantized data.

2. A method for encoding a digital audio signal as claimed in claim 1, wherein said each sub-band is a critical band having undistinguishable tones.

3. A method for encoding a digital audio signal as claimed in claim 1, wherein said bit number allocating step comprises the steps of:

calculating a signal-to-masked threshold ratio for each sub-band as a band ratio;

calculating the sum of the band ratio of each sub-band to obtain each channel ratio of said plurality of channels;

calculating an important factor of each channel according to the ratios of the respective channel ratio to sum of the channel ratios;

allocating the channel bit number from total bit numbers according to said obtained important factor of each channel;

calculating an important factor of each sub-band according to the ratios of the respective band ratios to said each channel ratio; and allocating the band bit number from said channel bit number according to said obtained important factor of each sub-band.

4. A method for encoding a digital audio signal as claimed in claim 3, wherein said masked threshold is obtained through the following steps of:

discrete-Fourier-transforming an analog audio signal and calculating the quantity of each signal in every sub-band of said transformed signal;

dividing the spectrum values in the sub-band of said transformed signal into a plurality of critical bands having undistinguishable tone and calculating the sum of power in each critical band;

calculating the masked threshold by said undistinguishable tone signal frequency and said sum of power;

setting up the maximum masked threshold in each critical band as a temporary masked threshold in the corresponding critical band; and comparing a no-signal threshold (absolute threshold) with said temporary masked threshold and setting up the higher of the two as a final masked threshold of the corresponding critical band.

5. A method for encoding a digital audio signal as claimed in claim 3, wherein said channel ratio of each channel is offset-corrected by subtracting a product value of the minimum band ratio among the band ratios multiplied by the number of bands.

6. A method for encoding a digital audio signal as claimed in claim 3, wherein said bit number of each band is allocated from a higher frequency component to a lower frequency component among said sub-band signals, considering the important factor of each band.

7. A method for encoding a digital audio signal as claimed in claim 3, wherein said ratio of each band is offset-corrected by subtracting the minimum band ratio of the ratios from the ratio of each band.

8. A method for encoding a digital audio signal as claimed in claim 3, wherein said important factor of the band is newly obtained from the ratio of the band to which a bit number is not allocated.

9. A method for encoding a digital audio signal as claimed in claim 3, wherein said bit number of a band is allocated considering band weight.

10. A method for encoding a digital audio signal as claimed in claim 1, comprising said quantizing step where the signals of each band are divided into tonal signals and non-tonal signals, the quantized error generated from a tonal signal is corrected by a tonal signal, and the quantized error generated from a non-tonal signal is corrected by a non-tonal signal.

11. A method for encoding a digital audio signal comprising the steps of:

mapping a digital audio signal into a plurality of sub-bands and outputting the mapped sub-band signals;

allocating a number of bits to the mapped sub-band signal of each sub-band according to human psychoacoustic properties, on the basis of the mapped sub-band signals;

compensating said each mapped sub-band signal by receiving a transmitted previous quantized error considering band weight, quantizing the compensated sub-band signal according to said allocated bit number, and transferring the current quantized error to a next quantization of an adjacent frequency component of the same sub-band considering band weight; and forming a transmit bit stream in frame units from said quantized data.

12. An apparatus for encoding a digital audio signal comprising:

a mapping unit for mapping a digital audio signal into a plurality of sub-bands and outputting the mapped sub-band signals;

a bit number allocating unit for allocating a number of bits to the sub-band signal of each band according to human psychoacoustic properties, on the basis of said mapped sub-band signals;

a quantizing unit for compensating said each sub-band signal by receiving a transmitted previous quantized error, quantizing the compensated sub-band signal according to said allocated bit number, and transferring the current quantized error to a next quantization of an adjacent frequency component of the same sub-band; and frame packing means for forming a transmit bit stream in frame units from the quantized data.

\* \* \* \* \*

UNITED STATES PATENT AND TRADEMARK OFFICE
CERTIFICATE OF CORRECTION

PATENT NO. : 5,673,289
DATED : September 30, 1997
INVENTOR(S) : Sang-wook Kim et al.

It is certified that error appears in the above-indentified patent and that said Letters Patent is hereby corrected as shown below:

<u>In the Specification:</u> Col. 6, line 13, "$B_{bd}$" should be -- $BT_{bd}$ --.

Signed and Sealed this

Seventeenth Day of March, 1998

Attest:

BRUCE LEHMAN

Attesting Officer

Commissioner of Patents and Trademarks